US008568153B2

(12) United States Patent
Gobel

(10) Patent No.: US 8,568,153 B2
(45) Date of Patent: Oct. 29, 2013

(54) PUSH-PUSH MECHANISM, IN PARTICULAR FOR CARD READERS

(75) Inventor: Marco Gobel, Ohringen (DE)

(73) Assignee: Amphenol-Tuchel Electronics GmbH (DE)

( * ) Notice: Subject to any disclaimer, the term of this patent is extended or adjusted under 35 U.S.C. 154(b) by 237 days.

(21) Appl. No.: 12/677,655

(22) PCT Filed: Sep. 12, 2008

(86) PCT No.: PCT/EP2008/007554
§ 371 (c)(1),
(2), (4) Date: Mar. 11, 2010

(87) PCT Pub. No.: WO2009/033705
PCT Pub. Date: Mar. 19, 2009

(65) Prior Publication Data
US 2010/0197155 A1    Aug. 5, 2010

(30) Foreign Application Priority Data

Sep. 15, 2007 (DE) .......................... 10 2007 044 170

(51) Int. Cl.
*H01R 13/62* (2006.01)
(52) U.S. Cl.
USPC ....................................................... 439/159
(58) Field of Classification Search
USPC ................................. 439/159, 630, 152–157
See application file for complete search history.

(56) References Cited

U.S. PATENT DOCUMENTS

| 6,123,560 | A | * | 9/2000 | Hara et al. | ..................... | 439/159 |
| 6,332,791 | B1 | | 12/2001 | Wang et al. | | |
| 6,537,090 | B2 | * | 3/2003 | Ozawa | ........................... | 439/159 |
| 6,572,392 | B2 | * | 6/2003 | Motojima | ..................... | 439/159 |
| 6,776,640 | B2 | * | 8/2004 | Nishioka | ........................ | 439/325 |
| 6,793,511 | B2 | * | 9/2004 | Murayama et al. | ........... | 439/188 |
| 6,817,874 | B2 | * | 11/2004 | Okabe | ........................... | 439/157 |
| 6,839,431 | B2 | | 1/2005 | Ooya et al. | | |
| 6,875,033 | B2 | * | 4/2005 | Sato et al. | ..................... | 439/159 |
| 6,890,195 | B2 | * | 5/2005 | Nagata | ........................... | 439/159 |
| 6,955,548 | B1 | | 10/2005 | Wang et al. | | |
| 6,981,885 | B2 | * | 1/2006 | Oh | ................................... | 439/159 |
| 7,131,853 | B2 | * | 11/2006 | Motojima | ..................... | 439/159 |
| 7,300,295 | B2 | * | 11/2007 | Kimura et al. | ................ | 439/159 |
| 7,367,827 | B2 | * | 5/2008 | Chen | ................................ | 439/159 |
| 7,381,069 | B2 | * | 6/2008 | Saito et al. | ..................... | 439/159 |
| 7,407,399 | B2 | * | 8/2008 | Motojima et al. | ............ | 439/159 |
| 7,448,890 | B2 | * | 11/2008 | Ting | .............................. | 439/159 |
| 7,576,980 | B2 | * | 8/2009 | Lin | ........................... | 361/679.56 |
| 7,891,997 | B2 | * | 2/2011 | Hirayama | ..................... | 439/159 |
| 7,901,225 | B2 | * | 3/2011 | Maruyama | .................... | 439/159 |
| 2006/0166532 | A1 | | 7/2006 | Tsai | | |
| 2007/0207650 | A1 | | 9/2007 | Saito et al. | | |

FOREIGN PATENT DOCUMENTS

JP    2000 260524 A    9/2000

* cited by examiner

*Primary Examiner* — Amy Cohen Johnson
*Assistant Examiner* — Vladimir Imas
(74) *Attorney, Agent, or Firm* — Blank Rome LLP

(57) ABSTRACT

The invention concerns a push-push mechanism, particularly for a card reader with a control cam and a control pin, which engages with the control cam and is operatively connected with a slider, during which the transition of the control pin from the initial position to the reading position takes place by a first push and the transition from the reading position back into the initial position by a second push on the control pin and thus the slider, whereby the control pin is flexibly deflected during its actuation along the control cam.

20 Claims, 7 Drawing Sheets

PUSH-PUSH MECHANISM, IN PARTICULAR FOR CARD READERS

CROSS-REFERENCE TO RELATED APPLICATIONS

The present application claims the benefit of International Patent Application no. PCT/EP2008/007554, filed Sep. 12, 2008, and German Patent No. 10 2007 044 170, filed Sep. 15, 2007, the entire disclosures of which are incorporated herein by reference.

BACKGROUND OF THE INVENTION

The invention relates to a push-push mechanism and thus the design of a control cam for a push-push mechanism. The invention thus concerns a push-push mechanism and particularly a control cam for a push-push mechanism, according to preamble in patent claim 1. In particular the invention concerns such push-push control cams that are suitable for application with a card reader, that includes a push-push mechanism. "Card" refers to chip-cards, smart cards and SIM cards, as well as other typical cards that are utilised in technology. Card reader refers to a card contacting device for application with a card. In the sense of the present invention, under push-push mechanism or push-push control cam respectively a device is understood which is suitable for inserting cards into a card reader with an initial push and with a second push on the card, this can be removed again from the card reader. In general the invention refers to a push mechanism, in which a control pin guided by the control cam is provided, which according to the present invention is mounted form-fittingly in a slider. Connectors of this kind with a push-push mechanism are already known in the state of the art. Thus U.S. Pat. No. 6,839,431 demonstrates a card contacting device with a push-push mechanism and a heart-shaped control cam. The mechanism shown there is composed of a variety of components. A slider which can be actuated by the card, works together via a control element with a control cam located in the card reader, in other words a heart-shaped control cam shown here. Furthermore a spring is provided which is mounted on the slider at its actuation end. The push-push mechanism shown here has on the one hand the disadvantage that many components are needed that in particular work together in a complicated way and if they in an inexact position, the function of the card reader will be impaired. The height of the whole card reader due a push mechanism of this type is another disadvantage. The required control cam or heart cam includes several stepwise mounted control regions, along which the control pin slides, depending on the actuation state. The various steps thus enable the control pin to be forcibly guided along the cam following one direction, as well as attaining specific intermediate states. However the number of states and intermediate states as well as the reading state and the opening state only possible with many steps within the control cam.

SUMMARY OF THE INVENTION

The basis of present invention is thus to so improve a generic push-push mechanism for a card contacting device that the total height of the card contacting device can be significantly minimised, at the same time as having a high degree of operational reliability. Another objective of the present invention is to reduce the number of components of a push-push mechanism according to the present invention.

This task is achieved by the characteristics of claim 1. In the sub-claims preferred designs of the invention are indicated.

According to the present invention a push-push mechanism is so designed with a control cam, that the control cam has a spring-loaded control pin which is forcibly guided and tensioned along the wall so that thereby the number of steps in the control cam can be reduced.

According to the present invention the control cam is designed as a two-step control cam, so that the control pin is pre-tensioned and can only follow a pre-defined path and thus is forcibly guided. However, with the number of steps the height increases due to its design. In the reading position the control pin is in a rest position which is formed by a V-shaped wall funnel. Since in the deflected state the control pin, due to its spring tension, tries to spring back against its deflection, it is possible to save steps in the area of the rest position. The return of the control pin back to the initial position in this respect does not have to take place with a compulsory step. In order to thus reduce the height of the control cam and the control pin, the control pin length can be matched with the only present step-height, so that on the one hand the total height are reduced by reducing the control pin length while at the same time reducing the number of steps.

According to the present invention the control pin is form-fittingly connected to the slider, which when used in a push-push card reader, can be actuated by inserting a card. According to the present invention due to its mounting the control pin has a stop upwards, so that due its pre-tension is always tries to return to its initial position against this pre-tension.

According to the present invention the slider is designed as one piece with the control pin and preferably manufactured as a bent stamped metal part. The control pin thus already obtains its pre-tension.

According to the present invention the slider features a card stop, over which the slider and thus the control pin can be actuated. According to the present invention, by actuation with a card after insertion of the card in the card contacting device, the slider is actuated via the card stop. By actuating the slider the control pin, which is form-fittingly connected to the slider, is forced along the wall and transported into a first latching and reading position. According to the present invention, the latching and reading position is thereby attained, in that the control pin at the end of the actuation path with the card, which moves the slider and thus the control pin into such a position, can spring into the said latching and reading position against its pre-tension. In this position, in other word the reading position of the card with respect to the card contacting device, a stable latching position is attained. In order to remove the card again from the card-receiver of the card contacting device and thus from the reading position, the card is actuated with a further push over the slider card stop against a spring with which the slider is connected. Thus the slider is pushed a bit further into the card-receiving compartment and the control pin, which is mounted on this, can thus leave its latching position, so that it strives to deflect further against its tension in order to lie flat against a second guide wall. If now the actuator lets go of the card after the second push, as a result of the spring tension acting on the spring slider, the slider complete with the card can be transported out of the card-receiving shaft and the control pin slides along the second guide wall back to its initial position. As a result the control pin covers a difference in height and surmounts a step at the end of the actuation process in order to return to its initial position. Preferably at the first push, and thereby with the insertion of the card, the control pin is so moved along the guide walls out of its rest position, that the pre-tension with increasing coverage of the actuation path increases and at the end of the actuation path a maximum pre-tension has been built up. If pressure is maintained on the push, thus at the end of the first push, as a result of the actuation of the card the control pin slips into the said latching position, in which the card is held in its reading position and the slider is thus tensioned against a coil spring.

Further advantages, objectives and details of the invention are shown in the description of design examples by means of the drawings; in the drawing is shown:

BRIEF DESCRIPTION OF THE DRAWINGS

In FIGS. 1 to 8 a section of card reader is shown in each case, which preferably represents a chip card reader, a smart card connector or a SIM card reader, or a reader in general and the present invention part of the push-push mechanism of such a card reader is shown in various positions. In FIG. 1 such a detail is shown, namely a push-push mechanism 1 of a card reader according to the present invention. Not shown is the left area of the card-receiving compartment connected to the detail and the cover typically provided for such a card reader, which together with the base 2 of the card reader forms the card-receiving compartment. Between the base 2 and the non-depicted cover there is a card-receiving compartment 3. In FIG. 1 this card-receiving compartment is only shown to some extent in the partial view. Part of the base 2 of the card reader is also shown, on which a card is lying ready to be inserted. A card is so far inserted at the insertion side end 4 of a card reader according to the present invention, until the insertion side end of the card meets the stop 6 of the slider 5. The push-push mechanism 1 perspectively shown in FIG. 1 essentially consists of a slider 5, with a card stop 6, and a spring 7, which pre-tensions the slider 5 in the position shown in FIG. 1 and furthermore including a control pin 8, which is fixed as one piece to the slider 5.

DETAILED DESCRIPTION OF THE PREFERRED EMBODIMENTS

In the following first of all the slider 5 and the control pin 8 will be described.

Figure 3:
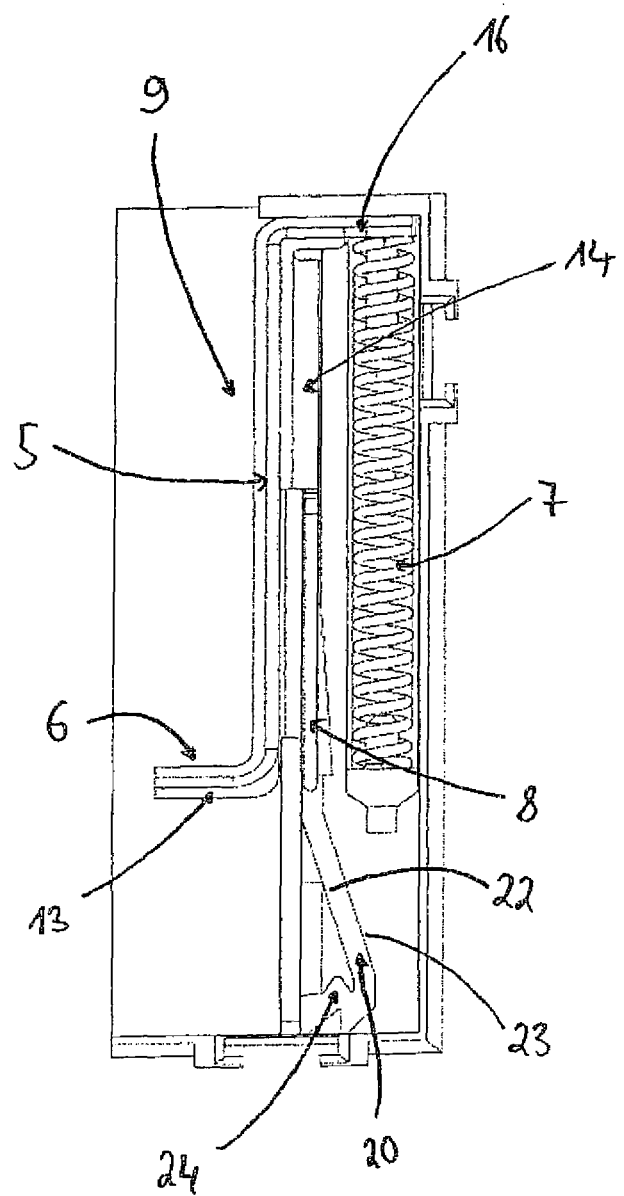
FIG. 3 a schematic top view of a push-push mechanism, in accordance with FIG. 1 in the initial position.

In FIG. 3 the slider 5 is in an initial position A and has a longitudinal arm 9, on which at both ends respectively a projecting cross arm 6, 16 is fixed. The first cross arm 6, which is in the card-receiving compartment and which projects into it, acts as the card stop 6. If a card is inserted into the card-receiving compartment 3, after insertion, it reaches the card stop 6 with the insertion side end, with which the slider 5 can be actuated. The second cross arm 16, which is fixed onto the insertion side end of the slider 5, projects in the opposite direction towards the side outer wall 10.

The cross arm 16 lies against the insertion side outer wall 11 with its front face, due to the pre-tension of the spring 7, which holds the slider 5 in this position. As can be clearly seen from FIG. 3, the spring-loaded control pin 8 is in its slack initial position and runs parallel to the longitudinal arm 9 of the slider 5. The slider 5 with the single-piece designed control pin 8 is here shown as a bent stamped part. The slider 5 in its cross-section has a more-or-less L-form and is bent along its radius 12 to the aforementioned L-form, so that the slider 5 has a base part 13, with which it can slide along the base 2 of the card reader. The base part 13 runs from one of the cross arms 6 over the longitudinal arm 9 to the second cross arm 16 along the whole slider 5 and is connected in between by means of a connecting element 14 to the control pin 8. The connecting element 14 is a partial elongation of the base part 13. On the front side end of the connecting element 14 the control pin 8 has a spring-loaded design. As evident in FIG. 1, the control pin 8 is fitted out with a guide pin 15 at its free end, which projects downwards away from the longitudinally aligned control pin 8 and with its end is seated on the control cam 20. In the initial position A of the slider 5 shown in FIG. 1 to FIG. 3, the control pin 8, which is fixed to this, is in its rest position and thus free of tension. The control pin 15 is so designed that it is guided along the control cam 20 when the slider 5 is actuated with the card. The control pin 8 thus has a free end 17 and a fixed end 18, which is flexibly hinged to the connecting element 14. The total height of the reader is thus given by the height of the control cam and the total height of the control pin, and particularly the length of the guide pin 15.

The Control Cam 20

The total height of the reader is defined by the geometric dimensions of the guide pin with the control pin, and the height or the total height of the control cam over which the control pin 8 slides with the end of its guide pin. Since the control cam 20 with its surface 21 travels up a slope with regard to the card sliding surface, which is shown as a parallel surface to the base 2 of the card reader, the highest point of the control cam 20 with regard to the base of the card reader is thus defined as the sum of the total height of the control pin 8 with the guide pin 15, which at the highest point lies with its end on the control cam 20. According to the present invention is shown as in FIG. 2, only with a step 26 placed in the control cam 20. The control cam 20 is a self-contained guide slot restricted by guide walls. The function of the control cam is to forcibly guide the control pin 8 with its guide pin 15 after actuation of the slider 5, namely along the given direction of movement in a clockwise direction, according to the sequence of FIGS. 1, 4 to 6.

The control cam is surrounded along its longitudinal alignment at any one time on both sides by the guide walls 22, 23. The guide wall 22 serves as a sliding surface for the guide pin 15, along which the control pin with its guide pin 15 can slide when the slider 5 is actuated. The control cam runs further to a recess 24, which is embossed in a V-form in the guide wall 22. The purpose of this recess 24 is the securing arrangement of the guide pin 15 of the control pin 8. At the end of the control cam section 25 the control cam end at a step 26, which then leads back to the initial position of the control cam 20. The control cam section 25 is restricted on its left side by the chamber wall 27 and on its right side by the surrounding guide wall 22 already mentioned previously. The total height of the reader and thus the height of the chamber wall 27 is determined by the height of the control cam 20 with reference to the underside of the base 2, which is the sum of the height of the control pin 8 with its guide pin 15.

Figure 1:
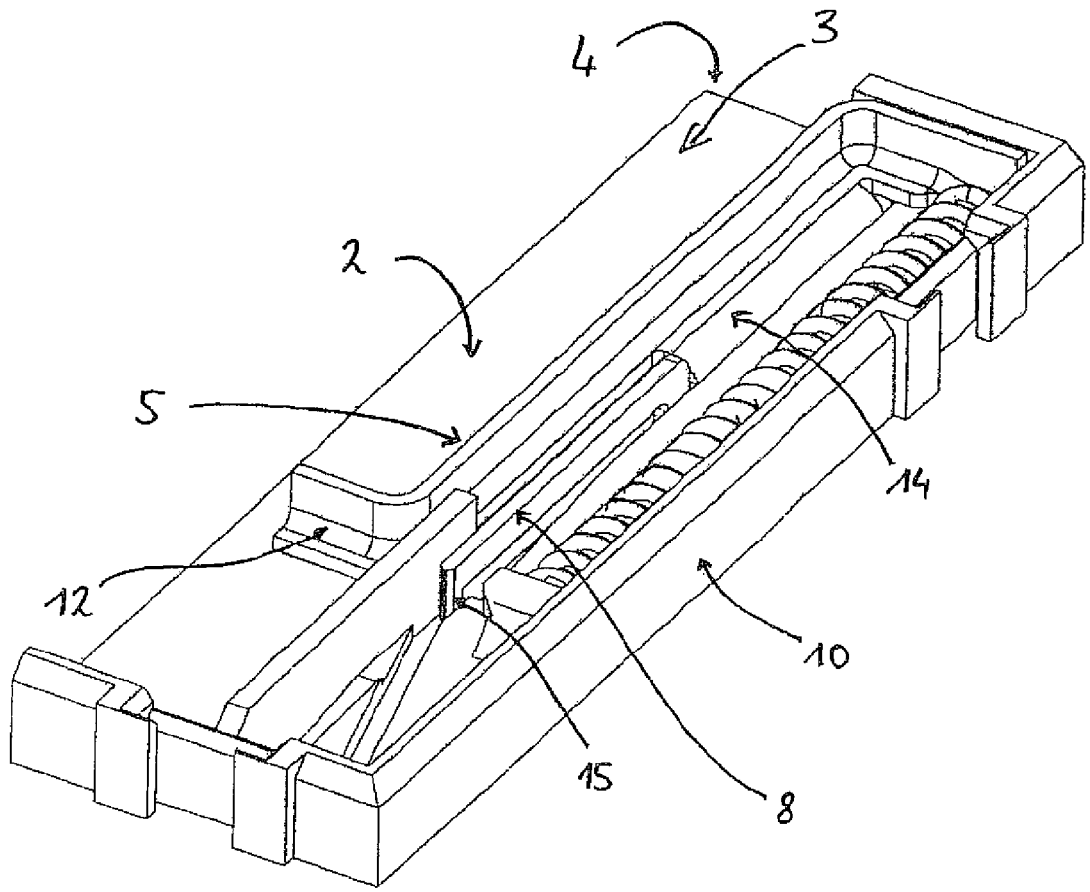
FIG. 1 a schematic top view, skew from above of a push-push mechanism.
Figure 2:
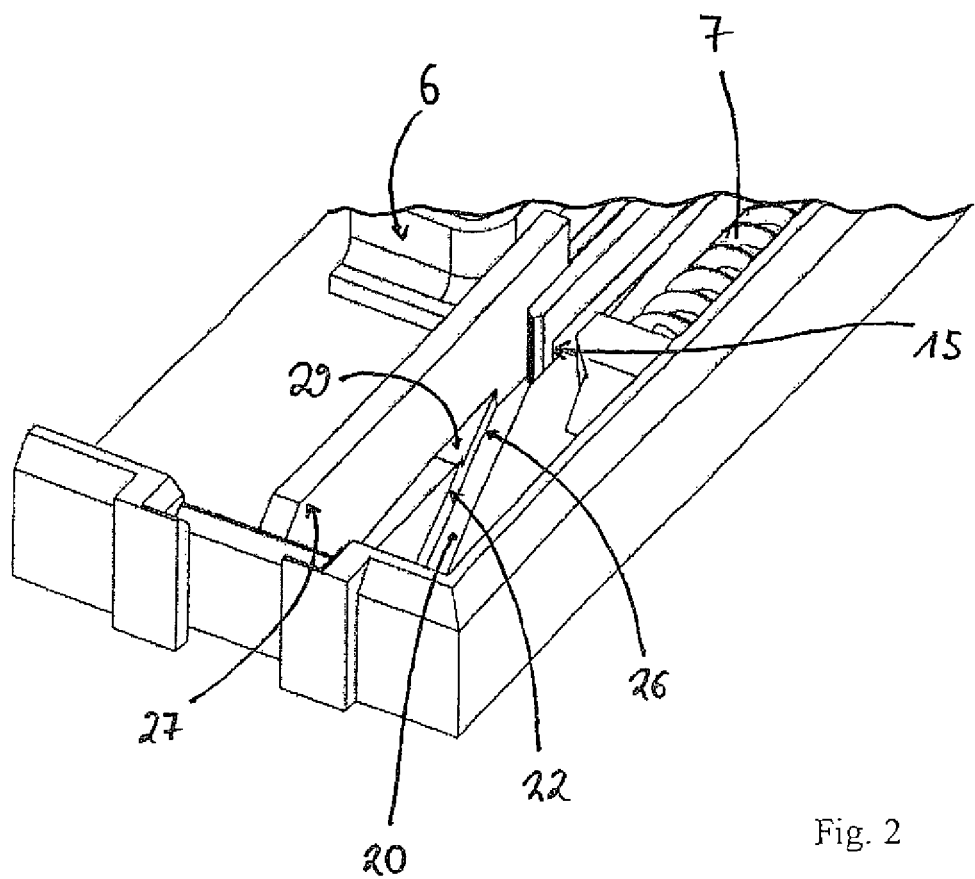
FIG. 2 a detailed view in accordance with FIG. 1 including the control cam.
Figure 4:
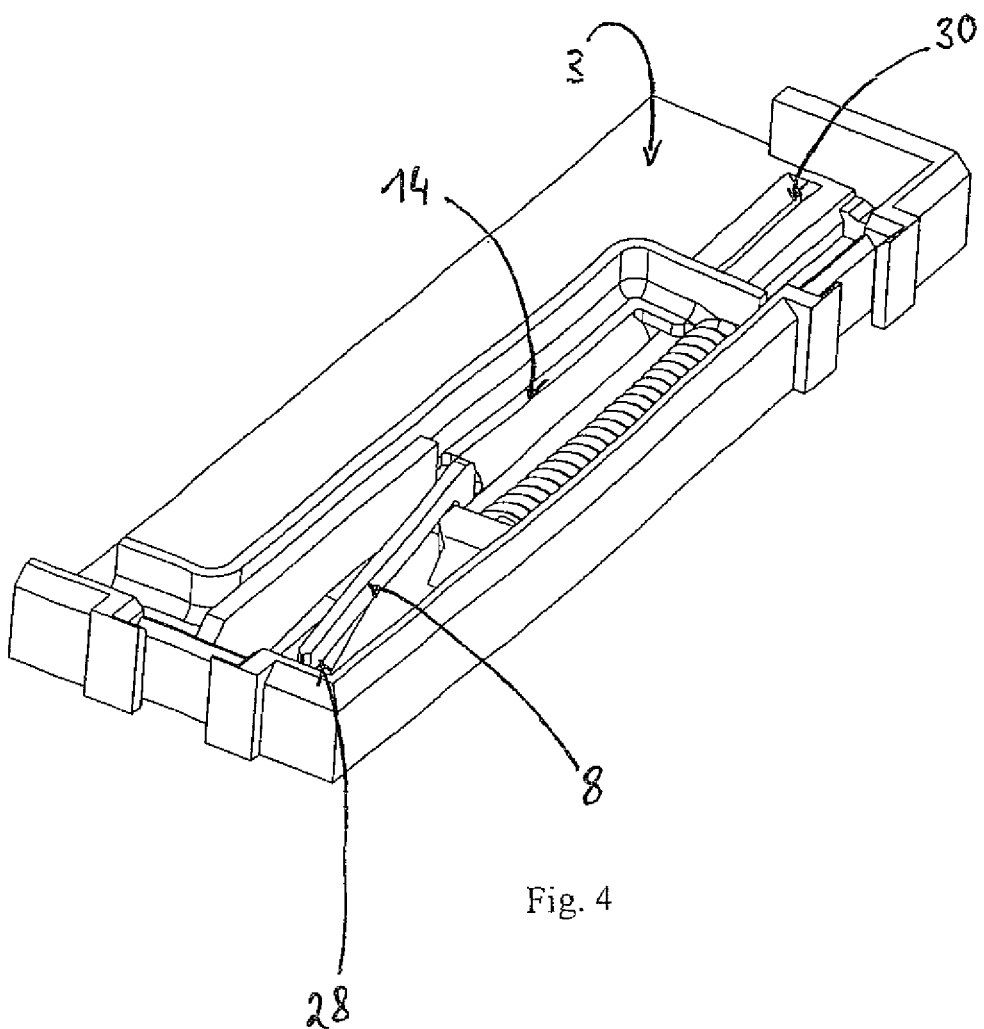
FIG. 4 a schematic top view, skew from above, of a push-push mechanism, in accordance with FIG. 1, but with actuated slider in a position shortly before the reading position.
Figure 5:
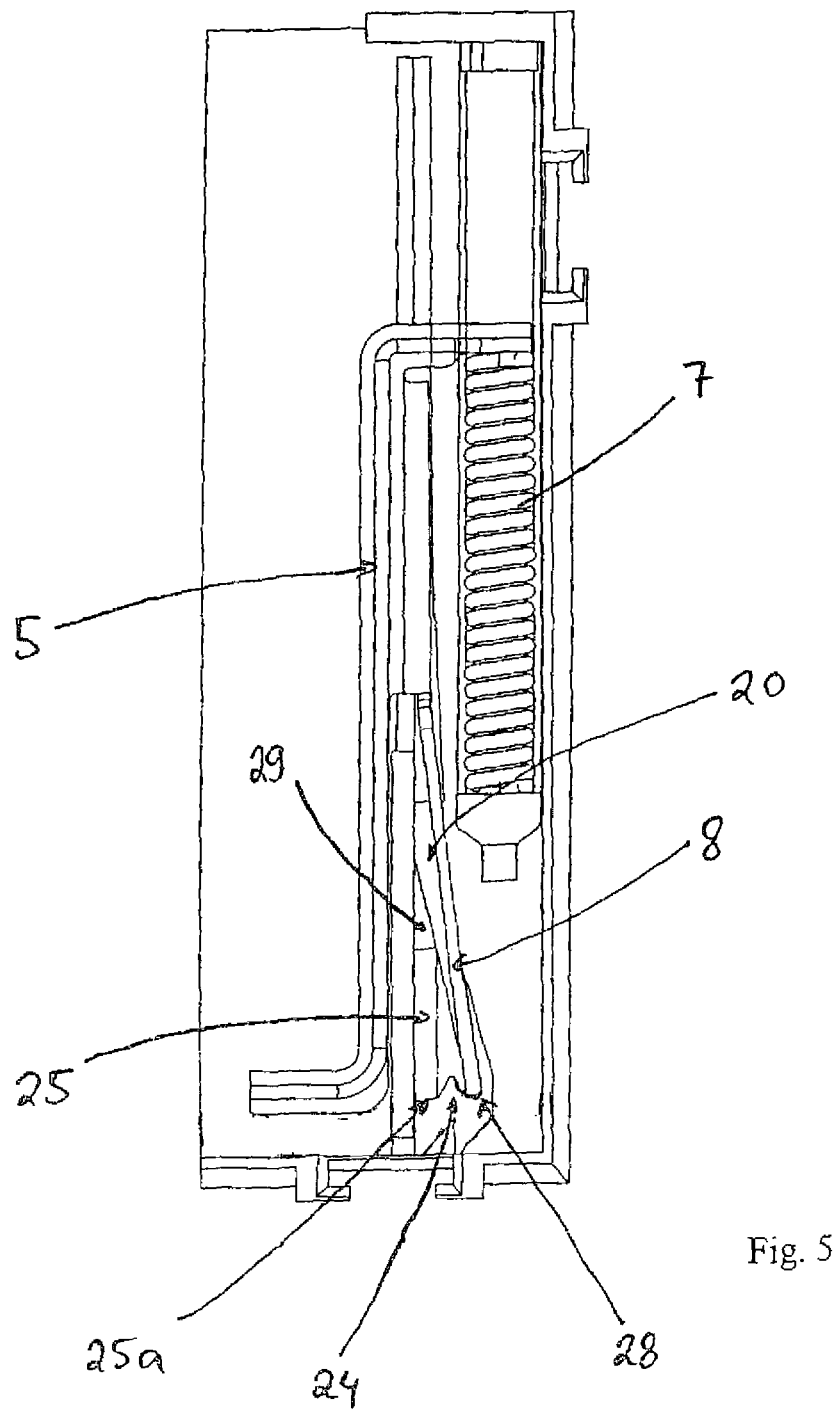
FIG. 5 a schematic top view of a push-push mechanism, in accordance with FIG. 4.

If the slider 5 is actuated with a card inserted into the opening slit of the card reader from the initial position A, as shown in FIG. 1 and FIG. 3, to the position as shown in FIG. 4, then the control pin 8 is guided along the guide wall 22 and along the control cam 20 until a maximum deflected position 28. As can be seen in FIG. 5, in this position the slider 5 has slid into the card-receiving compartment and the control pin 8 is flexibly deflected and pre-tensioned compared to its initial position. If the slider 5 is further actuated in the direction mentioned the guide pin 15 slides around the tip of the guide wall 22 and immerges in the recess 24. If the actuation pressure is now released on the card, the spring 7 tries to move the slide 8 against the actuation direction back into its initial position, which however is prevented, since the guide pin 15 of the control pin 8 engages and is retained in the recess 24 and the slider 5 is thus prevented from sliding back. Through this movement the purpose of the first push is therefore to move the card into a stable reading position, in which the control pin 8 is held in its latching position in the recess 24. According to the present invention as is shown in FIG. 5 the control pin 8 is flexibly deflected, so that when a the slider is further actuated as just described, it forcibly endeavours to return to its initial position, and thus moves in the direction of the chamber wall 27. In this way it slides automatically into the stable latching position and thus into the recess 24.

Figure 6:
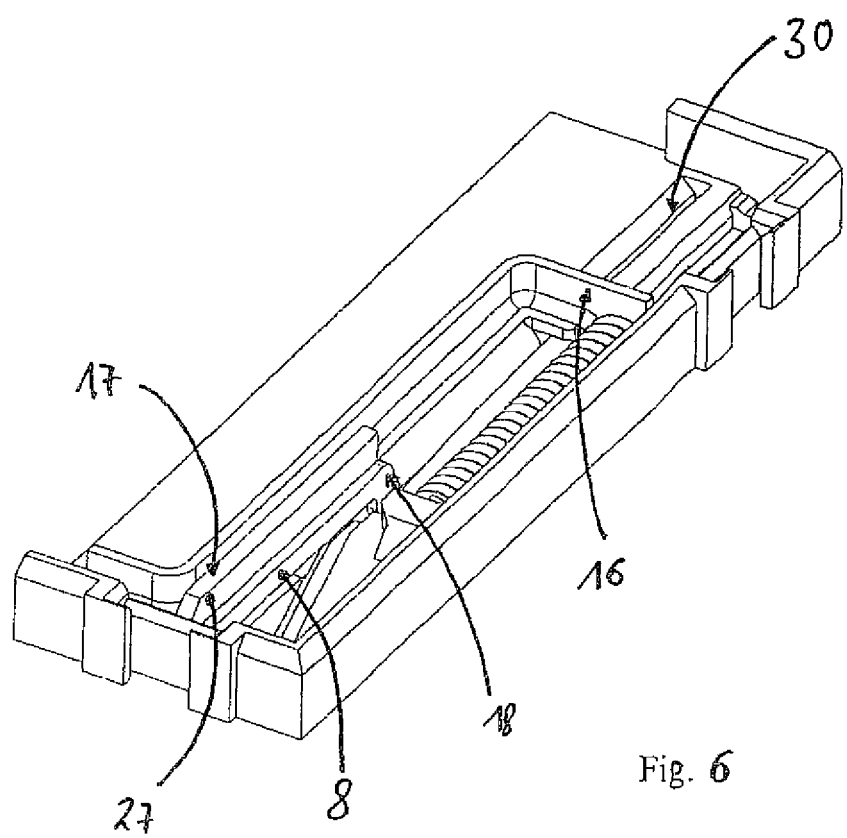
FIG. 6 a schematic top view, skew from above, of a push-push mechanism after a further push, however in particular the control pin has sprung back into a non-deflected position.
Figure 7:
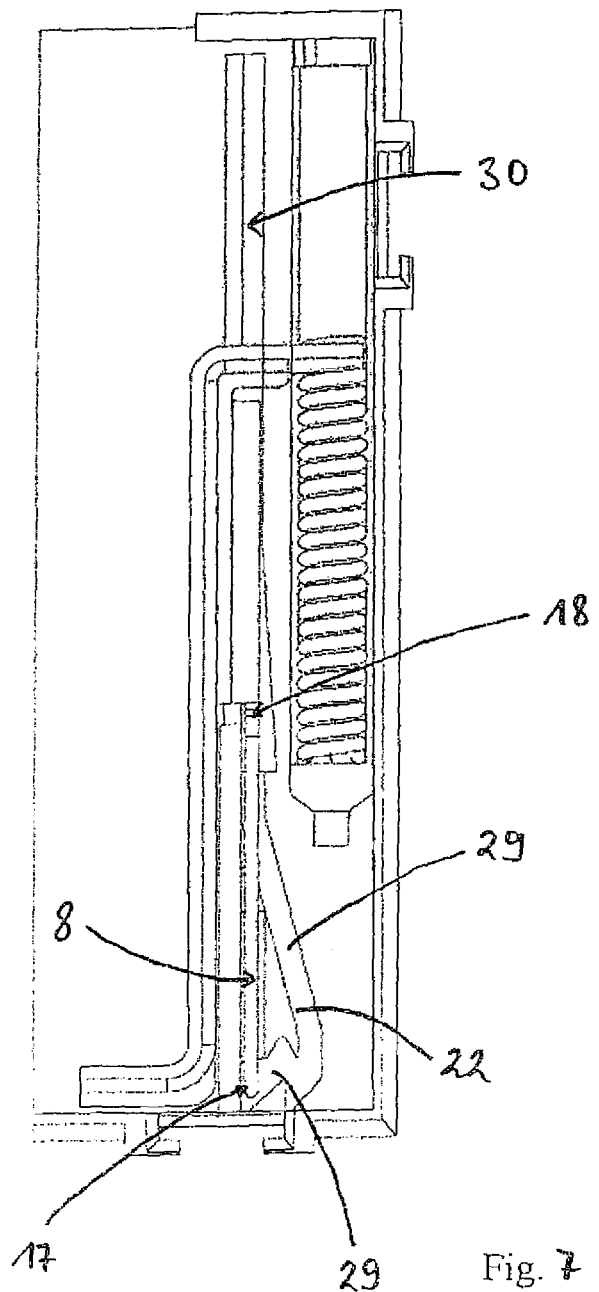
FIG. 7 a top view in accordance with FIG. 6

If again actuated, in other words there is another push on the card to remove this from the stable reading position, the control pin 24, which is still deflected in a spring-loaded and pre-tensioned state compared to its rest position, tries to spring back out of the recess 24 further in the direction of the chamber wall 27, as shown in FIG. 6 and FIG. 7.

In this position the control pin 8 is aligned parallel to the slider 5 and to the chamber wall 27 and can now slide along the control cam section 25 when the pressure is released. Since the control pin 8 can now move freely along the control cam, the spring 7 causes the slider 5 to be moved back into its starting position. Shortly before reaching the starting position A the control pin 8 reaches the step 26 with its guide pin 15. In this position the maximum height of the control cam and thus the minimum height of the card reader is defined. Since the control cam 20 is only designed with one single step 26, the total height of the reader is only influenced by the height of the control pin and this step. The control cam thus has a flat section, starting from the starting point A until the control cam section 26, which rises obliquely up to step 26, and shortly before reaching step 26 defines another flat, essentially triangularly designed control cam section 29. As can be seen in FIG. 4, the slider 5 slides into a guide slot 30 with a non-depicted guide pin. In the design here shown the slider 5 is pressed against the chamber wall 27 and slides along this, without having any concrete guiding devices, since due to the spring tension of the control pin 8, the slider 5 is also pressed continuously against the chamber wall 27, as soon as the slider is deflected from its initial position A and actuated. Thus the forcible guiding of the slider 5 parallel to the actuation direction is also achieved with the control pin 8, without requiring any further construction elements. Besides being a contact surface for the spring 7, the cross arm 16 forms a guide pin for the guide slot 30. The push-push movement described previously and thus the guiding of the control pin along the control cam can be repeated as often as desired and with the first push causes, so to speak, a stable reading position to be attained, and with a second push the removal of the card from the reading position into the removal position, corresponding to initial position A, is achieved.

LIST OF REFERENCE CHARACTERS

Push-Push Mechanism, in Particular for Card Readers
1 push-push mechanism
2 base
3 card-receiving compartment
4 card insertion side
5 slider
6 card stop/cross arm
7 spring
8 control pin
9 longitudinal arm
10 side outer wall
11 insertion side outer wall
12 radius
13 base part
14 connecting element
15 guide pin
16 cross arm
17 free end of the control pin
18 fixed end of the control pin
20 control cam
21 surface
22, 23 guide walls
24 recess
25 control cam section
25a start of the ascending control cam section
25b end of the ascending control cam section
26 step
27 chamber wall
28 deflection position
29 flat control cam section
30 guide slot

What is claimed is:

1. A push-push mechanism, particularly for a card reader, the push-push mechanism comprising:
   a slider having a longitudinal arm with a first end at which a first projecting cross arm is fixed and a second end at which a second projecting cross arm is fixed, and a base part extending from the first cross arm to the second cross arm, the base part configured to slide along a base of the card reader;
   a control cam;
   a spring, operatively connected to the slider; and
   a control pin, operatively connected to the slider, laterally disposed between the longitudinal arm of the slider and the spring, and configured to engage with the control cam,
   wherein the push-push mechanism is configured such that a transition of the control pin from an initial position to a reading position results from a first push on the slider, and a transition from the reading position back to the initial position results from a second push on the slider,
   wherein the control pin is substantially parallel to the longitudinal arm of the slider when the control pin is in the initial position,
   wherein the control pin is configured to be flexibly deflected during its actuation along the control cam,
   wherein the slider is connected to the control pin by a connecting element, the connecting element being a partial elongation of the base part, and
   wherein the control pin and the slider are designed as a single piece.

2. The push-push mechanism according to claim 1, wherein the control pin is configured to be flexibly deflected away from the slider in a deflection direction during the transition from the initial position to the reading position.

3. The push-push mechanism according to claim 2, wherein the spring is configured to exert a force on the slider in a direction opposite a direction of the first push, thereby moving the control pin back into the initial position.

4. The push-push mechanism according to claim 3, wherein at least a portion of a first side of the control cam is bordered by a first guide wall.

5. The push-push mechanism according to claim 4, wherein the control cam is configured such that the control pin is flexibly deflected as the control pin is guided along the first guide wall.

6. The push-push mechanism according to claim 5, wherein at least a portion of a second side of the control cam is bordered by a chamber wall, and wherein the chamber wall is configured to serve as a second guide wall for the control pin.

7. The push-push mechanism according to claim 6, wherein the first guide wall is configured to serve as a guide wall for the control pin during the transition from the initial position to the reading position, and wherein the chamber wall is configured to serve as a guide wall for the control pin during the transition from the reading position to the initial position.

8. The push-push mechanism according to claim 7, wherein the push-push mechanism is configured such that during the transition from the initial position to the reading position, the control pin reaches a position of maximum deflection, in which a tension in the control pin is maximized.

9. The push-push mechanism according to claim 8, wherein the push-push mechanism is configured such that, during the transition from the initial position to the reading position, after the control pin reaches the position of maximum deflection, the control pin springs back in a direction opposite the deflection direction.

10. The push-push mechanism according to claim 9, wherein the push-push mechanism is configured such that if the control pin transitions from the initial position back to the initial position without reaching the reading position, the control pin slides along the first guide wall and springs back in a direction opposite the deflection direction during the transition back to the initial position.

11. The push-push mechanism according to claim 10, wherein the first guide wall includes a recess, into which the control pin can latch in the reading position.

12. The push-push mechanism according to claim 11, wherein the control pin is configured to spring into the recess and to be held in a latch position in the recess after reaching the position of maximum deflection.

13. The push-push mechanism according to claim 12, wherein the control pin includes a guide pin, configured to enter into the recess in the first guide wall when the reading position is reached and the slider is held against a spring tension of the spring.

14. The push-push mechanism according to claim 13, wherein the control pin is configured such that during the transition from the reading position back to the initial position, the control pin springs from the recess to the chamber wall in a direction opposite the deflection direction.

15. The push-push mechanism according to claim 14, wherein a portion of the control cam bordered by the chamber wall includes an ascending section, and wherein the control pin is configured to slide up the ascending section during the transition from the reading position to the initial position.

16. The push-push mechanism according to claim 15, wherein an end of the portion of the control cam bordered by the chamber wall includes a flat, essentially triangular section.

17. The push-push mechanism according to claim 16 further comprising a step at an end of the flat, essentially triangular section.

18. The push-push mechanism according to claim 17, wherein the step is configured to direct the control pin toward the guide wall after the control pin impinges on the step.

19. The push-push mechanism according to claim 1, wherein the slider and the control pin are manufactured as a bent stamped metal part.

20. The push-push mechanism according to claim 6, wherein the slider is disposed on a first side of the chamber wall, and wherein the control pin is disposed on a second side of the chamber wall, opposite the first side.

* * * * *